Jan. 9, 1968  I. ZAHN  3,362,866
MACHINE FOR MAKING LAMINATED TAPE
Filed Sept. 1, 1965  3 Sheets-Sheet 1

INVENTOR.
IRWIN ZAHN
BY
JOHN P. CHANDLER
HIS ATTORNEY.

Jan. 9, 1968 I. ZAHN 3,362,866

MACHINE FOR MAKING LAMINATED TAPE

Filed Sept. 1, 1965 3 Sheets-Sheet 2

INVENTOR.
IRWIN ZAHN
BY
JOHN P. CHANDLER
HIS ATTORNEY.

Jan. 9, 1968     I. ZAHN     3,362,866

MACHINE FOR MAKING LAMINATED TAPE

Filed Sept. 1, 1965     3 Sheets-Sheet 3

INVENTOR.
IRWIN ZAHN
BY
JOHN P. CHANDLER
HIS ATTORNEY.

United States Patent Office 3,362,866
Patented Jan. 9, 1968

3,362,866
MACHINE FOR MAKING LAMINATED TAPE
Irwin Zahn, 185 Elm Road, Englewood, N.J. 07631
Filed Sept. 1, 1965, Ser. No. 484,225
2 Claims. (Cl. 156—543)

ABSTRACT OF THE DISCLOSURE

Machine for laminating three-ply tape, including reels for supply rolls and four rollers around which the tape, as it is laminated, is successively drawn.

---

Figure 1:
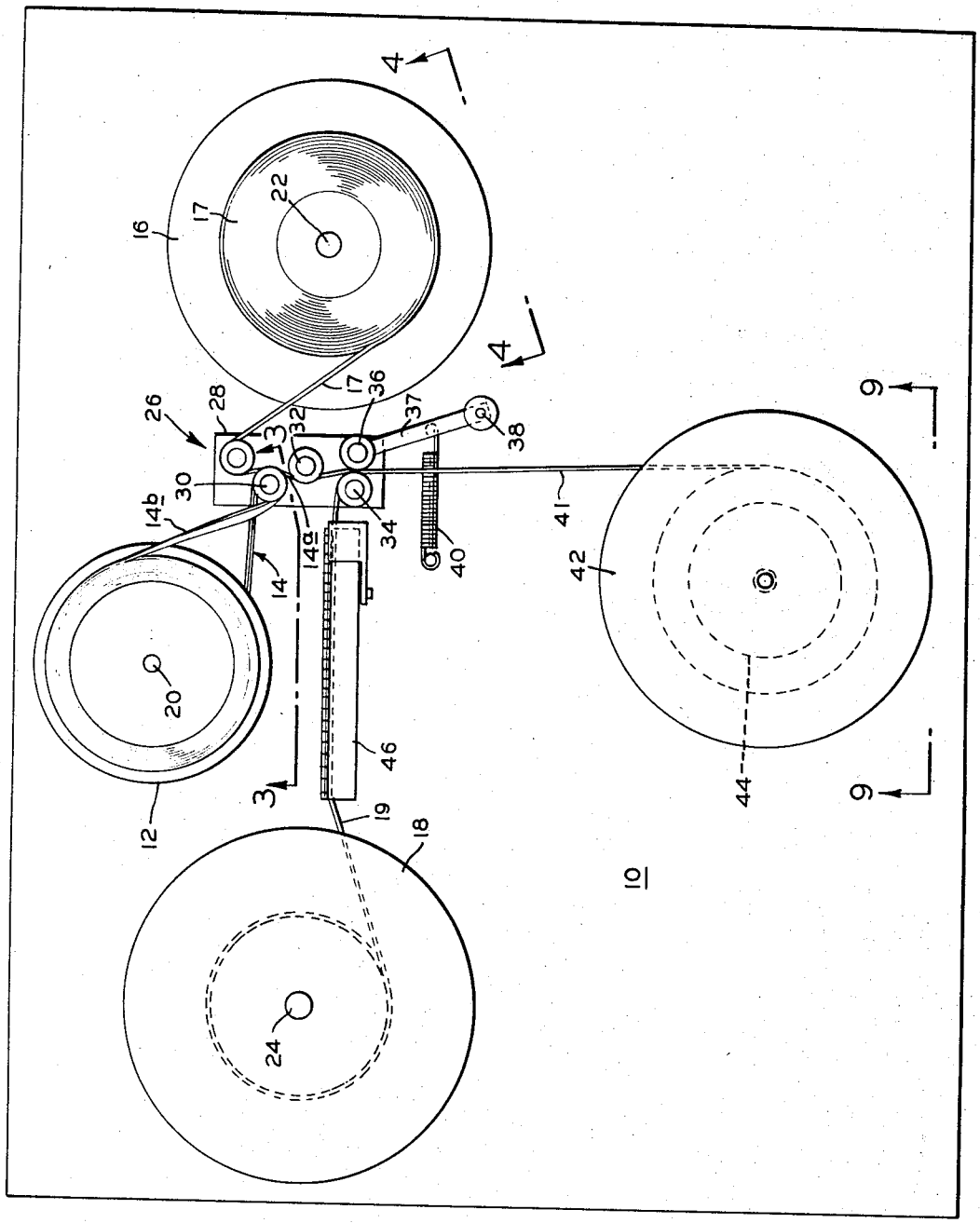

This invention relates to a machine for continuously laminating a fabric tape to a metal tape by running a strip of tape of plastic or other material and with adhesive on both sides between the fabric tape and the metal tape, while applying suitable pressure to the united tapes to effect a lasting lamination thereof.

A laminated tape of this character has a variety of uses including the construction of a generally C-shaped clamp for forming bow ties for general ornamental purpose. Bows of this character are used for personal feminine adornment and are worn in the hair, on dresses, scarves and the like. These bows are used in vast quantities and one of the objects of the present invention is to reduce the cost of manufacture thereof and at the same time to produce a bow having the apearance of the hand tied variety but of more durable construction and which cannot become untied. The machines for making the bow from the laminated material of the present invention forms the subject matter of another application.

An important object of the invention is to provide an efficient apparatus for stripping the backing from a web of narrow plastic tape with adhesive on both faces and simultaneously to adhere a thin metal tape and a fabric tape of ornamental or attractive surface characteristics to opposed faces of the adhesive tape.

Another object of the invention is to provide a machine for neatly aligning the several types including a tape with adhesive on both sides and a protective cover on one side, as they are unwound from their rolls, for applying a desired means of pressure to the tapes immediately after each layer has been joined, and for rewinding the protective layer removed from the pressure sensitive tape on a reel on the same shaft but in a reverse direction.

Figure 2:
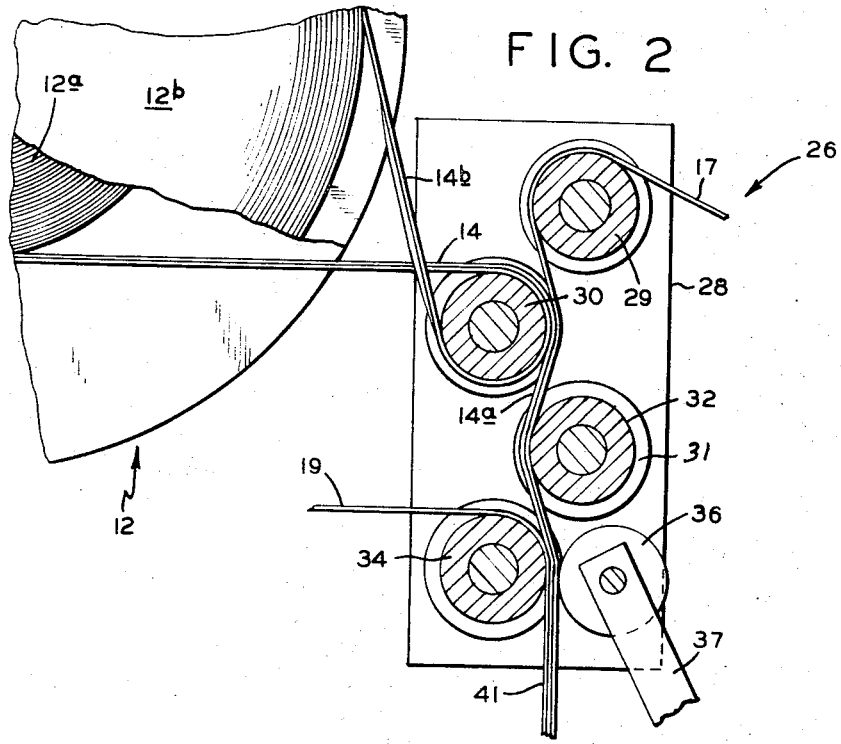
Figure 3:
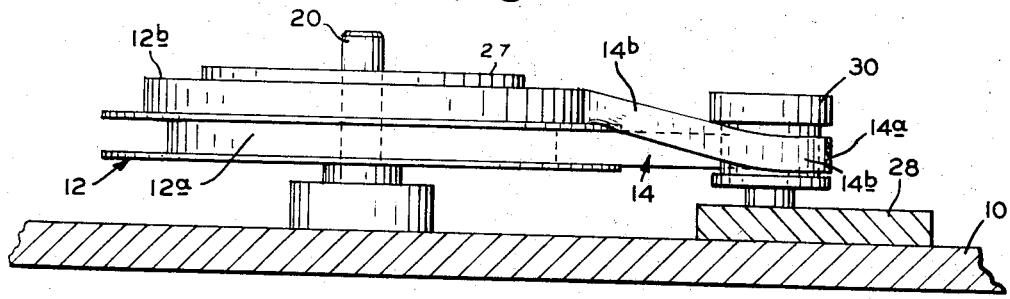
Figure 4:
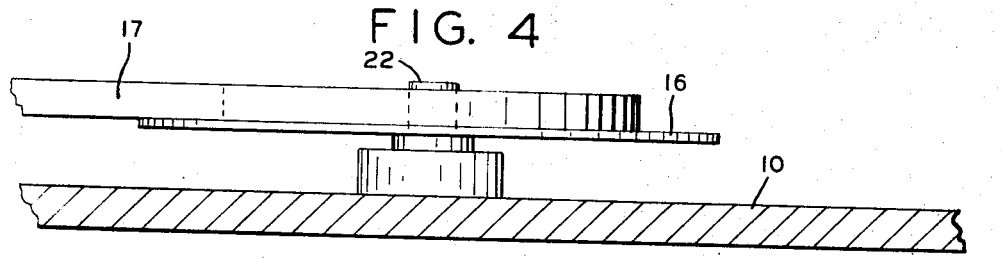
Figure 5:
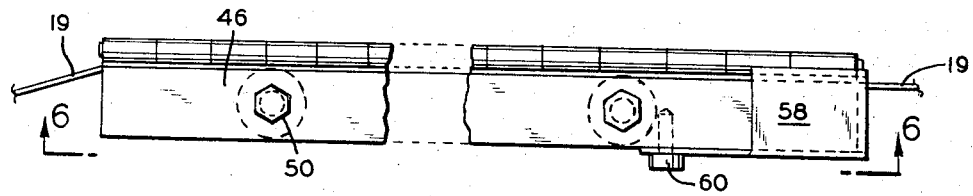
Figure 6:
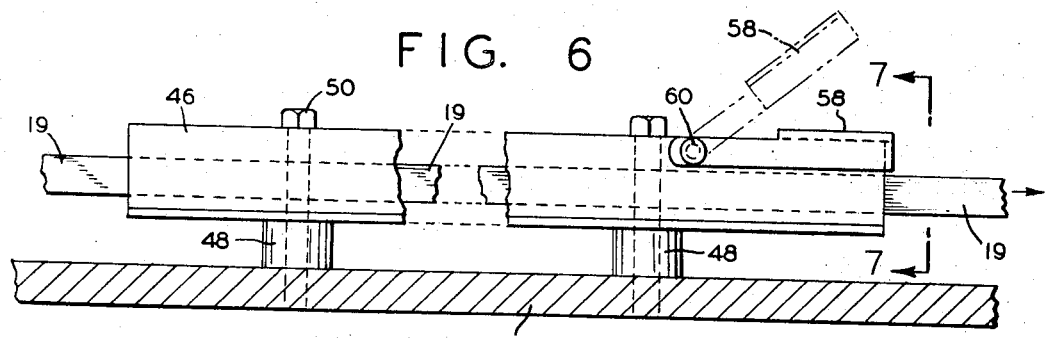
Figure 7:
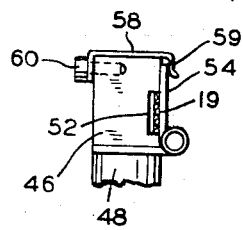
Figure 8:
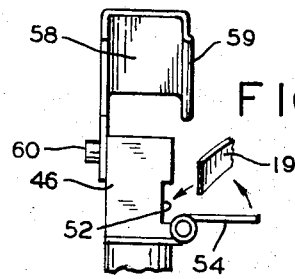
Figure 9:
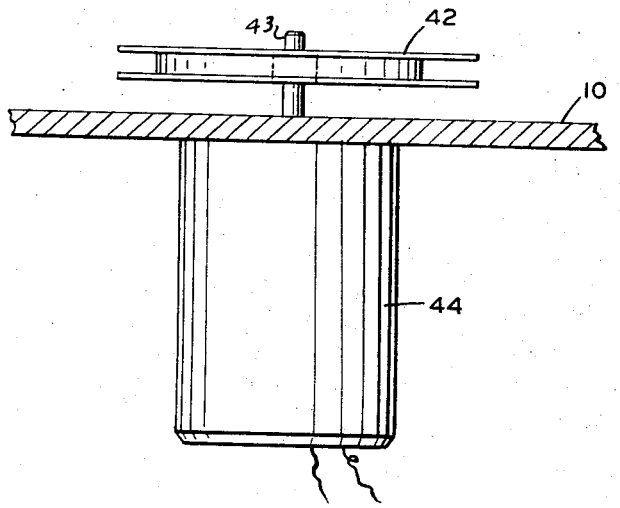

In the drawings:

FIG. 1 is a plan view of the mechanism;
FIG. 2 is an enlarged plan of the tape laminating area;
FIG. 3 is a view taken along line 3—3 of FIG. 1;
FIG. 4 is a view taken along line 4—4 of FIG. 1;
FIG. 5 is an enlarged plan of the ribbon feeding means;
FIG. 6 is an elevational view along line 6—6;
FIG. 7 is a view taken along line 7—7 of FIG. 6;
FIG. 8 is a view similar to FIG. 7 but showing the door open;
FIG. 9 is a view taken along line 9—9 of FIG. 1.

A base plate or frame 10 supports reels 12, 16 and 18 upon shafts 20, 22 and 24, respectively. The reel 12 has two decks 12a and 12b and the roll of tape 14 to be stripped is carried on deck 12a while the tape 14b, which has been stripped therefrom, is rewound on deck 12b in coiled fashion and in the opposite direction. Instead of one reel with two decks, two separate reels may be used but in either case rotation of reel 12a which is driven by uncoiling tension on tape 12 imparts rotation to reel 12b by friction or otherwise. Tape 14 is laminated and one of the laminae 14a has pressure sensitive adhesive on both sides thereof, the outer side being protected by the tape 14b formed from material having a coating thereon possessing a lower affinity for the adhesive so that the double adhesive face tape may be readily uncoiled from the roll and the protective tape can then be readily stripped from the second adhesive face which remains after the tape has been uncoiled.

Since roll 12a becomes smaller as tape 14 is unwound therefrom, and roll 14b of the protective tape becomes larger, it is desirable to wind the latter on a somewhat larger and heavier core 27 so that the surface speed of the latter is always slightly faster than that of reel 12a and there is a measure of slippage of reel 12b during rotation of 12a. The tape 14a, metal strip or tape 17 and fabric tape 19 are threaded through a stripping and laminating area 26 and the laminated tape wound on a take-up reel 42. A motor 44 with a shaft 43 and a suitable speed reduction unit (not shown) drives the take-up reel 42 which pulls the laminated tape 41 through the stripping and laminating area 26, pulling the fabric 19 off the reel 18 and the metal tape 17 off the reel 16 and the tape 14a off the reel 12 and at the same time winding the backing strip 14b from the tape 14 upon 12b of the reel 12.

The assembly area 26 comprises a block 28 upon which first, second, third and fourth rollers 29, 30, 32 and 34 respectively are mounted for rotation on the block in the arrangement shown and around which the strips are threaded as best seen in FIG. 2. A pressure roller 36 is mounted upon an arm 37. This arm is pivoted at 38 on the base 10 and it squeezes together the various strips to form a laminated strip 41 by pressing against the roller 34 due to the pressure of a spring 40. The arrangement of rollers 29, 30 and 34 is of special importance in the machine of the present invention. These are essentially idle rollers around which the tapes to be laminated travel, while roller 32 is essentially a guide roller. When metal tape 17 and adhesive tape 14 are joined together, pressure is applied thereto by means of the guide roller 32 which presses against the two layers which would otherwise have straight line travel between rollers 30 and 34, and hence, no laminating pressure before fabric tape 19 is joined to the partially laminated structure. In other words, the left hand face or roller 32, when viewed as in FIG. 2, lies to the left of a line tangent to the right hand faces of rollers 29 and 34. Each of the 4 rollers has upper and lower discs 31 (FIG. 2) which serve to guide the opposed edge of the tape to perfect alignment with each other.

After tape 19 is rejoined the pressure roller 36 completes the lamination of the 3 layer tape as it emerges, under tension, from rollers 34 and 36.

In order to guide the strip 19 properly to the assembly area 26 a guide block 46 is mounted upon spacer washers 48 upon the base plate 10 by means of bolts 50. A longitudinal channel section 52 in the block 46 receives the strip 19 and is held in place by a hinged door 54. A latching lever 58 provided with an overhanging edge 59 pivots about a screw 60 to be moved into locked position, FIG. 7, holding the door 54 against opening.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. An apparatus for continuously laminating a first tape to a second tape with a third tape comprising a double faced adhesive tape positioned therebetween and a protective tape initially covering one of said adhesive faces before laminating, said apparatus comprising a frame and shafts mounted on the frame, reels mounted on the shafts, each reel carrying a supply roll of one of the tapes, and another reel for rewinding the finished laminated tape mounted on one of said shafts, means for driving said latter reel so as to pull the laminated tape through the apparatus, the shaft for the adhesive tape supply reel being provided with a second reel which rotates conjointly with the first reel, the protective tape being rewound on said second reel, the latter tape extending in a direction around said reel opposite from the adhesive tape on its reel so as to automatically rewind the protective tape as the adhesive tape is separated therefrom, first, second, third and fourth rollers mounted on the frame, the first tape being led around the first roller where it contacts the third tape led around the second roller, the second tape being led around the fourth roller where it is joined to the third and first tapes, a guide roller between the second and fourth rollers pressing the first tape against the second, and a final pressure roller pressing the final laminated tape against the fourth roller.

2. An apparatus for continuously laminating a metal tape to a fabric tape with a double faced adhesive tape positioned therebetween and a protective tape initially covering one of said adhesive faces before laminating, said apparatus comprising a frame and shafts mounted on the frame, reels mounted on the shafts, each reel carrying a supply roll of one of the tapes, and another reel for rewinding the finished, laminated tape mounted on one of said shafts, means for driving said latter reel so as to pull the laminated tape through the apparatus, the shaft for the adhesive tape supply reel being provided with a second reel which rotates conjointly with the first reel, the protective tape being rewound on said second reel, the latter tape extending in a direction around said reel opposite from the adhesive tape on its reel so as to automatically rewind the protective tape as the adhesive tape is separated therefrom, first, second, third and fourth rollers mounted on the frame, the metal tape being led around the first roller where it contacts the adhesive tape led around the second roller, the fabric tape being led around the fourth roller where it is joined to the adhesive and metal tapes, a guide roller between the second and fourth rollers whose periphery lies inwardly of a line tangent to said latter rollers so as to apply pressure between the metal and adhesive tapes, and a final pressure roller pressing the final laminated tape against the fourth roller.

References Cited

UNITED STATES PATENTS

| | | | |
|---|---|---|---|
| 2,398,879 | 4/1946 | Bouget | 242—67.3 X |
| 2,726,979 | 12/1955 | Grant | 156—313 |
| 3,288,384 | 11/1966 | Clark | 242—55 |

EARL M. BERGERT, *Primary Examiner.*

MARTIN L. KATZ, *Assistant Examiner.*